United States Patent
Wright et al.

(10) Patent No.: US 10,320,959 B2
(45) Date of Patent: *Jun. 11, 2019

(54) MULTI-LAYER TRANSPARENT STRUCTURES FOR ELECTRONIC DEVICE HOUSINGS

(71) Applicant: Apple Inc., Cupertino, CA (US)

(72) Inventors: Derek W. Wright, Cupertino, CA (US); Justin R. Wodrich, Cupertino, CA (US); Benjamin M. Rappoport, Santa Barbara, CA (US)

(73) Assignee: APPLE INC., Cupertino, CA (US)

( * ) Notice: Subject to any disclaimer, the term of this patent is extended or adjusted under 35 U.S.C. 154(b) by 18 days.

This patent is subject to a terminal disclaimer.

(21) Appl. No.: 15/338,157

(22) Filed: Oct. 28, 2016

(65) Prior Publication Data

US 2017/0048365 A1    Feb. 16, 2017

Related U.S. Application Data

(63) Continuation of application No. 13/249,038, filed on Sep. 29, 2011, now Pat. No. 9,516,149.

(51) Int. Cl.
*H04M 1/02* (2006.01)
*B32B 17/10* (2006.01)
(Continued)

(52) U.S. Cl.
CPC ..... *H04M 1/0249* (2013.01); *B32B 17/10018* (2013.01); *B32B 17/10036* (2013.01);
(Continued)

(58) Field of Classification Search
CPC ............. H04M 1/0249; H04M 1/0266; H04M 1/0202; H04M 1/185; B32B 17/10018;
(Continued)

(56) References Cited

U.S. PATENT DOCUMENTS 2,643,020 A    6/1953    Dalton
3,415,637 A    12/1968   Glynn
(Continued)

FOREIGN PATENT DOCUMENTS

AT    283630     10/1970
CN    1277090    12/2000
(Continued)

OTHER PUBLICATIONS

Aben, "Laboratory of Photoelasticity," Institute of Cybernetics at TTU, www.ioc.ee/res/photo.html, Oct. 5, 2000.
(Continued)

*Primary Examiner* — Bernard Rojas
(74) *Attorney, Agent, or Firm* — Brownstein Hyatt Farber Schreck, LLP

(57) ABSTRACT

Transparent structures for portions of electronic device housings are disclosed. The transparent structures are formed from multiple layers of transparent (optically clear) materials. The multiple layers can include at least an outer glass layer and one or more other transparent layers that can be either glass or polymer layers. The multiple layers can be bonded together with one or more lamination layers. Accordingly, multi-layer transparent structures that are formed from multiple layers bonded together are able to be not only thin but also sufficiently strong and resistant to damage. The multi-layer transparent structures are well suited for use in consumer products, such as consumer electronic devices (e.g., portable electronic devices).

17 Claims, 6 Drawing Sheets

(51) Int. Cl.
*G06F 1/16* (2006.01)
*H04M 1/18* (2006.01)

(52) U.S. Cl.
CPC .... *B32B 17/1077* (2013.01); *B32B 17/10137* (2013.01); *B32B 17/10761* (2013.01); *G06F 1/1626* (2013.01); *H04M 1/0202* (2013.01); *H04M 1/0266* (2013.01); *B32B 2307/412* (2013.01); *B32B 2457/202* (2013.01); *H04M 1/185* (2013.01); *Y10T 156/10* (2015.01)

(58) Field of Classification Search
CPC ........ B32B 17/10036; B32B 17/10137; B32B 17/10761; B32B 17/1077; B32B 2457/202; Y10T 156/10
USPC .................... 361/600, 679.01, 728, 729, 730
See application file for complete search history.

(56) References Cited

U.S. PATENT DOCUMENTS

| | | |
|---|---|---|
| 3,441,398 A | 4/1969 | Hess |
| 3,467,508 A | 9/1969 | Loukes et al. |
| 3,498,773 A | 3/1970 | Due et al. |
| 3,558,415 A | 1/1971 | Rieser et al. |
| 3,607,172 A | 9/1971 | Poole et al. |
| 3,619,240 A | 11/1971 | Toussaint et al. |
| 3,626,723 A | 12/1971 | Plumat |
| 3,652,244 A | 3/1972 | Plumat |
| 3,753,840 A | 8/1973 | Plumat |
| 3,798,013 A | 3/1974 | Inoue et al. |
| 3,843,472 A | 10/1974 | Toussaint et al. |
| 3,857,689 A | 12/1974 | Koizumi et al. |
| 3,926,605 A | 12/1975 | Kunkle |
| 3,951,707 A | 4/1976 | Kurtz et al. |
| 4,015,045 A | 3/1977 | Rinehart |
| 4,052,184 A | 10/1977 | Anderson |
| 4,119,760 A | 10/1978 | Rinehart |
| 4,130,684 A | 12/1978 | Little, Jr. et al. |
| 4,156,755 A | 5/1979 | Rinehart |
| 4,165,228 A | 8/1979 | Ebata et al. |
| 4,148,082 A | 12/1979 | Ganswein et al. |
| 4,212,919 A | 7/1980 | Hoda |
| 4,218,230 A | 8/1980 | Hogan |
| 4,277,299 A | 7/1981 | Cherenko et al. |
| 4,277,538 A | 7/1981 | Beckmann et al. |
| 4,346,601 A | 8/1982 | France |
| 4,353,649 A | 10/1982 | Kishii |
| 4,393,700 A | 7/1983 | Fabian |
| 4,425,810 A | 1/1984 | Simon et al. |
| 4,537,820 A | 8/1985 | Nowobliski et al. |
| 4,646,722 A | 3/1987 | Silverstein et al. |
| 4,733,973 A | 3/1988 | Machak et al. |
| 4,824,722 A | 4/1989 | Jarrett |
| 4,842,629 A | 6/1989 | Clemens et al. |
| 4,844,724 A | 7/1989 | Sakai et al. |
| 4,846,868 A | 7/1989 | Aratani |
| 4,849,002 A | 7/1989 | Rapp |
| 4,855,186 A | 8/1989 | Grolig et al. |
| 4,872,896 A | 10/1989 | LaCourse et al. |
| 4,911,743 A | 3/1990 | Brinkmann et al. |
| 4,937,129 A | 6/1990 | Yamazaki |
| 4,946,523 A | 8/1990 | Meussner |
| 4,957,364 A | 9/1990 | Chesler |
| 4,959,548 A | 9/1990 | Kupperman et al. |
| 4,983,197 A | 1/1991 | Froning et al. |
| 4,986,130 A | 1/1991 | Engelhaupt et al. |
| 4,999,071 A | 3/1991 | Nakamura et al. |
| 5,041,173 A | 8/1991 | Shikata et al. |
| 5,104,435 A | 4/1992 | Oikwawa et al. |
| 5,129,934 A | 7/1992 | Koss |
| 5,157,746 A | 10/1992 | Tobita et al. |
| 5,160,523 A | 11/1992 | Honkanen et al. |
| 5,238,743 A | 8/1993 | Grolig et al. |
| 5,254,149 A | 10/1993 | Hashemi et al. |
| 5,269,888 A | 12/1993 | Morasca |
| 5,281,303 A | 1/1994 | Beguin et al. |
| 5,369,267 A | 11/1994 | Johnson et al. |
| 5,411,563 A | 5/1995 | Yeh |
| 5,437,193 A | 8/1995 | Schleitweiler et al. |
| 5,445,871 A | 8/1995 | Murase et al. |
| 5,483,261 A | 1/1996 | Yasutake |
| 5,488,204 A | 1/1996 | Mead et al. |
| 5,525,138 A | 6/1996 | Hashemi et al. |
| 5,625,154 A | 4/1997 | Matsuhiro et al. |
| 5,654,057 A | 8/1997 | Kitayama |
| 5,725,625 A | 3/1998 | Kitayama et al. |
| 5,733,622 A | 3/1998 | Starcke et al. |
| 5,766,493 A | 6/1998 | Shin |
| 5,780,371 A | 7/1998 | Rifqi et al. |
| 5,816,225 A | 10/1998 | Koch et al. |
| 5,825,352 A | 10/1998 | Bisset et al. |
| 5,826,601 A | 10/1998 | Muraoka et al. |
| 5,835,079 A | 11/1998 | Shieh |
| 5,880,411 A | 3/1999 | Gillespie et al. |
| 5,880,441 A | 3/1999 | Gillespie et al. |
| 5,930,047 A | 7/1999 | Gunz et al. |
| 5,953,094 A | 9/1999 | Matsuoka et al. |
| 5,985,014 A | 11/1999 | Ueda et al. |
| 6,050,870 A | 4/2000 | Suginoya et al. |
| 6,114,039 A | 9/2000 | Rifqui |
| 6,120,908 A | 9/2000 | Papanu et al. |
| 6,159,608 A | 12/2000 | Friedmand et al. |
| 6,166,915 A | 12/2000 | Lake et al. |
| 6,188,391 B1 | 2/2001 | Seely et al. |
| 6,245,313 B1 | 6/2001 | Suzuki et al. |
| 6,261,398 B1 | 7/2001 | Costa |
| 6,287,674 B1 | 9/2001 | Verlinden et al. |
| 6,307,590 B1 | 10/2001 | Yoshida |
| 6,310,610 B1 | 10/2001 | Beaton et al. |
| 6,323,846 B1 | 11/2001 | Westerman et al. |
| 6,325,704 B1 | 12/2001 | Brown et al. |
| 6,327,011 B2 | 12/2001 | Kim |
| 6,350,664 B1 | 2/2002 | Haji et al. |
| 6,393,180 B1 | 5/2002 | Farries et al. |
| 6,429,840 B1 | 8/2002 | Sekiguchi |
| 6,437,867 B2 | 8/2002 | Zeylikovich et al. |
| 6,516,634 B1 | 2/2003 | Green et al. |
| 6,521,862 B1 | 2/2003 | Brannon |
| 6,621,542 B1 | 9/2003 | Aruga |
| 6,690,387 B2 | 2/2004 | Zimmerman et al. |
| 6,718,612 B2 | 4/2004 | Bajorek |
| 6,769,274 B2 | 8/2004 | Cho et al. |
| 6,772,610 B1 | 8/2004 | Albrand et al. |
| 6,810,688 B1 | 11/2004 | Duisit et al. |
| 6,936,741 B2 | 8/2005 | Munnig et al. |
| 6,955,971 B2 | 10/2005 | Ghyselen et al. |
| 7,012,700 B2 | 3/2006 | De Groot et al. |
| 7,013,709 B2 | 3/2006 | Hajduk et al. |
| 7,015,894 B2 | 3/2006 | Morohoshi |
| 7,070,837 B2 | 7/2006 | Ross |
| 7,165,362 B2 | 1/2007 | Jobs et al. |
| 7,166,531 B1 | 1/2007 | van Den Hoek et al. |
| 7,184,064 B2 | 2/2007 | Zimmerman et al. |
| 7,201,965 B2 | 4/2007 | Gulati et al. |
| 7,261,943 B2 | 8/2007 | Fugiel et al. |
| 7,461,564 B2 | 12/2008 | Glaesmann |
| 7,558,054 B1 | 7/2009 | Prest et al. |
| 7,626,807 B2 | 12/2009 | Hsu |
| 7,663,607 B2 | 2/2010 | Hotelling et al. |
| 7,810,355 B2 | 10/2010 | Feinstein et al. |
| 7,872,644 B2 | 1/2011 | Hong et al. |
| 7,918,019 B2 | 4/2011 | Chang et al. |
| 7,966,785 B2 | 6/2011 | Zadesky et al. |
| 8,013,834 B2 | 9/2011 | Kim |
| 8,110,268 B2 | 2/2012 | Hegemier et al. |
| 8,111,248 B2 | 2/2012 | Lee et al. |
| 8,123,897 B2 | 2/2012 | Kimura et al. |
| 8,196,636 B2 | 6/2012 | Sung et al. |
| 8,278,379 B2 | 10/2012 | Toyama et al. |
| 8,312,743 B2 | 11/2012 | Pun et al. |
| 8,315,043 B2 | 11/2012 | Lynch et al. |
| 8,391,010 B2 | 3/2013 | Rothkopf |
| 8,393,175 B2 | 3/2013 | Kohli et al. |

(56) References Cited

U.S. PATENT DOCUMENTS

| | | |
|---|---|---|
| 8,551,283 B2 | 10/2013 | Pakula et al. |
| 8,673,163 B2 | 3/2014 | Zhong |
| 8,684,613 B2 | 4/2014 | Weber et al. |
| 8,824,140 B2 | 9/2014 | Prest |
| 2002/0035853 A1 | 3/2002 | Brown et al. |
| 2002/0105793 A1 | 8/2002 | Oda |
| 2002/0155302 A1 | 10/2002 | Smith et al. |
| 2002/0157199 A1 | 10/2002 | Piltingsrud |
| 2003/0024274 A1 | 2/2003 | Cho et al. |
| 2003/0057183 A1 | 3/2003 | Cho et al. |
| 2003/0077453 A1 | 7/2003 | Oaku et al. |
| 2003/0234771 A1 | 12/2003 | Mulligan et al. |
| 2004/0051944 A1 | 3/2004 | Stark |
| 2004/0119701 A1 | 6/2004 | Mulligan et al. |
| 2004/0137828 A1 | 7/2004 | Takashashi et al. |
| 2004/0142118 A1 | 7/2004 | Takechi |
| 2004/0163414 A1 | 8/2004 | Eto et al. |
| 2005/0058423 A1 | 3/2005 | Brinkmann et al. |
| 2005/0105071 A1 | 5/2005 | Ishii |
| 2005/0135724 A1 | 6/2005 | Helvajian et al. |
| 2005/0174525 A1 | 8/2005 | Tsuboi |
| 2005/0193772 A1 | 9/2005 | Davidson et al. |
| 2005/0245165 A1 | 11/2005 | Harada et al. |
| 2005/0259438 A1 | 11/2005 | Mizutani |
| 2005/0285991 A1 | 12/2005 | Yamazaki |
| 2006/0026521 A1 | 2/2006 | Hotelling et al. |
| 2006/0055936 A1 | 3/2006 | Yun et al. |
| 2006/0063351 A1 | 3/2006 | Jain |
| 2006/0070694 A1 | 4/2006 | Rehfeld et al. |
| 2006/0097991 A1 | 5/2006 | Hotelling et al. |
| 2006/0197753 A1 | 9/2006 | Hotelling et al. |
| 2006/0227331 A1 | 10/2006 | Wollmer et al. |
| 2006/0238695 A1 | 10/2006 | Miyamoto |
| 2006/0250559 A1 | 11/2006 | Bocko et al. |
| 2006/0268528 A1 | 11/2006 | Zadesky et al. |
| 2006/0292822 A1 | 12/2006 | Xie |
| 2006/0294420 A1 | 12/2006 | Schneider |
| 2007/0003796 A1 | 1/2007 | Isono et al. |
| 2007/0013822 A1 | 1/2007 | Kawata et al. |
| 2007/0029519 A1 | 2/2007 | Kikuyama et al. |
| 2007/0030436 A1 | 2/2007 | Sasabayashi |
| 2007/0039353 A1 | 2/2007 | Kamiya |
| 2007/0046200 A1 | 3/2007 | Fu et al. |
| 2007/0063876 A1 | 3/2007 | Wong |
| 2007/0089827 A1 | 4/2007 | Funatsu |
| 2007/0122542 A1 | 5/2007 | Halsey et al. |
| 2007/0132737 A1 | 6/2007 | Mulligan et al. |
| 2007/0196578 A1 | 8/2007 | Karp et al. |
| 2007/0236618 A1 | 10/2007 | Magg et al. |
| 2008/0020919 A1 | 1/2008 | Murata |
| 2008/0026260 A1 | 1/2008 | Kawai |
| 2008/0074028 A1 | 3/2008 | Ozolins et al. |
| 2008/0094716 A1 | 4/2008 | Ushiro et al. |
| 2008/0135157 A1 | 6/2008 | Higuchi |
| 2008/0158181 A1 | 7/2008 | Hamblin et al. |
| 2008/0202167 A1 | 8/2008 | Cavallaro et al. |
| 2008/0230177 A1 | 9/2008 | Crouser et al. |
| 2008/0243321 A1 | 10/2008 | Walser et al. |
| 2008/0251057 A1 | 10/2008 | Slobodin |
| 2008/0264176 A1 | 10/2008 | Bertrand et al. |
| 2008/0286548 A1 | 11/2008 | Ellison et al. |
| 2009/0046240 A1 | 2/2009 | Bolton |
| 2009/0049773 A1 | 2/2009 | Zadesky et al. |
| 2009/0067141 A1 | 3/2009 | Dabov et al. |
| 2009/0091551 A1 | 4/2009 | Hotelling et al. |
| 2009/0096937 A1 | 4/2009 | Bauer et al. |
| 2009/0100872 A1 | 4/2009 | Hawtof et al. |
| 2009/0153729 A1 | 6/2009 | Hiltunen et al. |
| 2009/0162703 A1 | 6/2009 | Kawai |
| 2009/0197048 A1 | 8/2009 | Glaesemann et al. |
| 2009/0220761 A1 | 9/2009 | Dejneka et al. |
| 2009/0257189 A1 | 10/2009 | Wang et al. |
| 2009/0324899 A1 | 12/2009 | Feinstein et al. |
| 2009/0324939 A1 | 12/2009 | Feinstein et al. |
| 2010/0009154 A1 | 1/2010 | Allan et al. |
| 2010/0024484 A1 | 2/2010 | Kashima |
| 2010/0028607 A1 | 2/2010 | Lee et al. |
| 2010/0035038 A1 | 2/2010 | Barefoot et al. |
| 2010/0053632 A1 | 3/2010 | Alphonse et al. |
| 2010/0062284 A1 | 3/2010 | Watanabe et al. |
| 2010/0119846 A1 | 5/2010 | Sawada |
| 2010/0137031 A1 | 6/2010 | Griffin et al. |
| 2010/0154992 A1 | 6/2010 | Feinstein et al. |
| 2010/0167059 A1 | 7/2010 | Hasimoto et al. |
| 2010/0171920 A1 | 7/2010 | Nishiyama |
| 2010/0179044 A1 | 7/2010 | Sellier et al. |
| 2010/0206008 A1 | 8/2010 | Harvey et al. |
| 2010/0215862 A1 | 8/2010 | Gomez et al. |
| 2010/0216514 A1 | 8/2010 | Smoyer et al. |
| 2010/0224767 A1 | 9/2010 | Kawano et al. |
| 2010/0265188 A1 | 10/2010 | Chang et al. |
| 2010/0279067 A1 | 11/2010 | Sabia et al. |
| 2010/0285275 A1 | 11/2010 | Baca et al. |
| 2010/0296027 A1 | 11/2010 | Matsuhira et al. |
| 2010/0315570 A1 | 12/2010 | Dinesh et al. |
| 2010/0321305 A1 | 12/2010 | Chang et al. |
| 2011/0003619 A1 | 1/2011 | Fujii |
| 2011/0012873 A1 | 1/2011 | Prest et al. |
| 2011/0019123 A1 | 1/2011 | Prest et al. |
| 2011/0019354 A1 | 1/2011 | Prest et al. |
| 2011/0030209 A1 | 2/2011 | Chang et al. |
| 2011/0063550 A1 | 3/2011 | Gettemy et al. |
| 2011/0067447 A1 | 3/2011 | Zadesky et al. |
| 2011/0072856 A1 | 3/2011 | Davidson et al. |
| 2011/0102346 A1 | 5/2011 | Orsley et al. |
| 2011/0149321 A1 | 6/2011 | Eda et al. |
| 2011/0164372 A1 | 7/2011 | McClure et al. |
| 2011/0182084 A1 | 7/2011 | Tomlinson |
| 2011/0186345 A1 | 8/2011 | Pakula et al. |
| 2011/0188846 A1 | 8/2011 | Sorg |
| 2011/0199687 A1 | 8/2011 | Sellier et al. |
| 2011/0248152 A1 | 10/2011 | Svajda et al. |
| 2011/0255000 A1 | 10/2011 | Weber et al. |
| 2011/0255250 A1 | 10/2011 | Dinh |
| 2011/0267833 A1 | 11/2011 | Verrat-Debailleul et al. |
| 2011/0279383 A1 | 11/2011 | Wilson et al. |
| 2011/0300908 A1 | 12/2011 | Grespan et al. |
| 2012/0018323 A1 | 1/2012 | Johnson et al. |
| 2012/0227399 A1 | 2/2012 | Yeates |
| 2012/0099113 A1 | 4/2012 | de Boer et al. |
| 2012/0105400 A1 | 5/2012 | Mathew et al. |
| 2012/0118628 A1 | 5/2012 | Pakula et al. |
| 2012/0135195 A1 | 5/2012 | Glaesemann et al. |
| 2012/0136259 A1 | 5/2012 | Milner et al. |
| 2012/0151760 A1 | 6/2012 | Steijner |
| 2012/0188743 A1 | 7/2012 | Wilson et al. |
| 2012/0196071 A1 | 8/2012 | Cornejo et al. |
| 2012/0202040 A1 | 8/2012 | Barefoot et al. |
| 2012/0236477 A1 | 9/2012 | Weber et al. |
| 2012/0236526 A1 | 9/2012 | Weber et al. |
| 2012/0281381 A1 | 11/2012 | Sanford |
| 2012/0328843 A1 | 12/2012 | Cleary et al. |
| 2013/0071601 A1 | 3/2013 | Bibl et al. |
| 2013/0083506 A1 | 4/2013 | Wright et al. |
| 2013/0182259 A1 | 7/2013 | Brezinski et al. |
| 2013/0213565 A1 | 8/2013 | Lee et al. |
| 2014/0176779 A1 | 6/2014 | Weber et al. |

FOREIGN PATENT DOCUMENTS

| | | |
|---|---|---|
| CN | 136449 | 9/2002 |
| CN | 1694589 | 11/2005 |
| CN | 101025502 | 8/2007 |
| CN | 101206314 | 6/2008 |
| CN | 101523275 | 2/2009 |
| CN | 101465892 | 6/2009 |
| CN | 102131357 | 7/2011 |
| CN | 101267509 | 8/2011 |
| CN | 1322339 | 11/2011 |
| CN | 202799425 | 3/2013 |
| DE | 1496586 | 6/1969 |
| DE | 1771268 | 12/1971 |
| DE | 3212612 | 10/1983 |
| DE | 10322350 | 12/2004 |

(56) References Cited

FOREIGN PATENT DOCUMENTS

| | | |
|---|---|---|
| EP | 1038663 | 9/2000 |
| EP | 1206422 | 11/2002 |
| EP | 1592073 | 11/2005 |
| EP | 1593658 | 11/2005 |
| EP | 2025556 | 2/2009 |
| EP | 2036867 | 3/2009 |
| EP | 2075237 | 7/2009 |
| EP | 2196870 | 6/2010 |
| EP | 2233447 | 9/2010 |
| EP | 2483216 | 8/2012 |
| EP | 2635540 | 9/2013 |
| FR | 2797627 | 2/2001 |
| FR | 2801302 | 5/2001 |
| GB | 1346747 | 2/1974 |
| JP | S42011599 | 6/1963 |
| JP | S48006925 | 3/1973 |
| JP | S5537451 | 3/1980 |
| JP | S5567529 | 5/1980 |
| JP | S5595645 | 7/1980 |
| JP | S55136979 | 10/1980 |
| JP | S55144450 | 11/1980 |
| JP | S59013638 | 1/1984 |
| JP | S5937451 | 2/1984 |
| JP | S61097147 | 5/1986 |
| JP | 6066696 | 10/1986 |
| JP | S6360129 | 3/1988 |
| JP | S63222234 | 9/1988 |
| JP | H0532431 | 2/1993 |
| JP | H05249422 | 9/1993 |
| JP | 6242260 | 9/1994 |
| JP | H07050144 | 2/1995 |
| JP | H09073072 | 3/1997 |
| JP | S5231757 | 3/1997 |
| JP | H09507206 | 7/1997 |
| JP | 09312245 | 12/1997 |
| JP | 2000086261 | 3/2000 |
| JP | 2000163031 | 6/2000 |
| JP | 200203895 | 7/2000 |
| JP | 2001083887 | 3/2001 |
| JP | 2002160932 | 6/2002 |
| JP | 2002338283 | 11/2002 |
| JP | 2002342033 | 11/2002 |
| JP | 2003502257 | 1/2003 |
| JP | 2003146705 | 5/2003 |
| JP | 2004094256 | 3/2004 |
| JP | 2004259402 | 9/2004 |
| JP | 2004339019 | 12/2004 |
| JP | 2005140901 | 6/2005 |
| JP | 2005156249 | 6/2005 |
| JP | 2005156766 | 6/2005 |
| JP | 2009234856 | 6/2005 |
| JP | 2007099557 | 4/2007 |
| JP | 2008001590 | 1/2008 |
| JP | 2008007360 | 1/2008 |
| JP | 2008063166 | 3/2008 |
| JP | 2008066126 | 3/2008 |
| JP | 2008192194 | 8/2008 |
| JP | 2008195602 | 8/2008 |
| JP | 2008216938 | 9/2008 |
| JP | 2008306149 | 12/2008 |
| JP | 2009167086 | 7/2009 |
| JP | 2008196602 | 10/2009 |
| JP | 2009230341 | 10/2009 |
| JP | 2010060908 | 3/2010 |
| JP | 2010064943 | 3/2010 |
| JP | 2010116276 | 5/2010 |
| JP | 2010195600 | 9/2010 |
| JP | 2010237493 | 10/2010 |
| JP | 2011032124 | 2/2011 |
| JP | 2011032140 | 2/2011 |
| JP | 2011158799 | 8/2011 |
| JP | 2011231009 | 11/2011 |
| JP | 2011527661 | 11/2011 |
| JP | 2013537723 | 10/2013 |
| KR | 20060005920 | 1/2006 |
| KR | 20100019526 | 2/2010 |
| KR | 20110030919 | 3/2011 |
| TW | 201007521 | 2/2010 |
| TW | 201235744 | 9/2012 |
| WO | WO00/47529 | 8/2000 |
| WO | WO02/42838 | 5/2002 |
| WO | WO2004/014109 | 2/2004 |
| WO | WO2004/061806 | 7/2004 |
| WO | WO2004/106253 | 12/2004 |
| WO | WO2007/089054 | 8/2007 |
| WO | WO2008/044694 | 4/2008 |
| WO | WO2008/143999 | 11/2008 |
| WO | WO2009/003029 | 12/2008 |
| WO | WO2009/078406 | 6/2009 |
| WO | WO2009/099615 | 8/2009 |
| WO | WO2009/102326 | 8/2009 |
| WO | WO2009/125133 | 10/2009 |
| WO | WO2010/005578 | 1/2010 |
| WO | WO2010/014163 | 2/2010 |
| WO | WO2010/019829 | 2/2010 |
| WO | WO2010/080988 | 7/2010 |
| WO | WO2010/101961 | 9/2010 |
| WO | WO2011/008433 | 1/2011 |
| WO | WO2011/041484 | 4/2011 |
| WO | WO2012/015960 | 2/2012 |
| WO | WO2012/027220 | 3/2012 |
| WO | WO2012/106280 | 8/2012 |
| WO | WO2013/106242 | 7/2013 |

OTHER PUBLICATIONS

Author Unknown, "Chemically Strengthened Glass," Wikipedia, Apr. 19, 2009.

Author Unknown, "iPhone 4," Wikipedia, 17 pages, Jan. 4, 2012.

Author Unknown, "Toward Making Smart Phone Touch-Screens More Glare and Smudge Resistant," e! Science News, http://esciencenews.com/articles/2009/08/19toward.making.smart.phone.touch.screens.more.glare.and.smudge.resistant, 1 page, Aug. 19, 2009.

Forooghian et al., Investigative Ophthalmology & Visual Science, vol. 49, No. 10, Oct. 2008.

Karlsson et al., "The Technology of Chemical Glass Strengthening—a review," Glass Technology, European Jounral of Glass Science and Technology, vol. 51, No. 2, pp. 41-54, Apr. 2010.

Kingery et al., "Introduction to Ceramics," 2nd Edition, John Wiley & Sons, pp. 792 and 833-844, 1976.

Lee et al., "A Multi-Touch Three Dimensional Touch-Sensitive Tablet," Proceedings of CHI: ACM Conference on Human Factors in Computing Systems, pp. 21-25, Apr. 1985.

Mehrl et al., "Designer's Notebook: Proximity Detection IR LED and Optical Crosstalk," http://ams.com/eng/content/view/download/145137, 5 pages, Aug. 1, 2011.

Ohkuma, "Development of a Manufacturing Process of a Thin, Lightweight LCD Cell," Department of Cell Process Development, IBM, Japan, Section 13.4.

Rubin, "The Automatic Recognition of Gestures," CMU-CS-91-202, Submitted in Partial Fulfillment of the Requirements of the Degree of Doctor of Philosophy in Computer Science at Carnegie Mellon University, 285 pages, Dec. 1991.

Rubin, "Combining Gestures and Direct Manipulation," CHI'92, pp. 659-660, May 1992.

Varshneya, Arun K., Chemical Strengthening of Glass: Lessons Learned and Yet to be Learned International Journal of Applied Glass Science, pp. 131-142, 2010.

Westerman, "Hand Tracking, Finger Identification and Chordic Manipulation of a Multi-Touch Surface," A Dissertation Submitted to the Faculty of the University of Delaware in Partial Fulfillment of the Requirements for the degree of Doctor of Philosophy in Electrical Engineering, 364 pages, Spring 1999.

MULTI-LAYER TRANSPARENT STRUCTURES FOR ELECTRONIC DEVICE HOUSINGS

CROSS-REFERENCE TO RELATED APPLICATION(S)

This application is a continuation patent application of U.S. patent application Ser. No. 13/249,038, filed Sep. 29, 2011 and titled "Multi-Layer Transparent Structures for Electronic Device Housing", the disclosure of which is hereby incorporated herein by reference in its entirety.

BACKGROUND OF THE INVENTION

Conventionally, some portable electronic devices use glass as a part of their devices, either internal or external. Externally, a glass part can be provided as part of a housing, such a glass part is often referred to as a cover glass. The transparent and scratch-resistance characteristics of glass make it well suited for such applications. Internally, glass parts can be provided to support display technology. More particularly, for supporting a display, a portable electronic device can provide a display technology layer beneath an outer cover glass. A sensing arrangement can also be provided with or adjacent the display technology layer. By way of example, the display technology layer may include or pertain to a Liquid Crystal Display (LCD) that includes a Liquid Crystal Module (LCM). The LCM generally includes an upper glass sheet and a lower glass sheet that sandwich a liquid crystal layer therebetween. The sensing arrangement may be a touch sensing arrangement such as those used to create a touch screen. For example, a capacitive sensing touch screen can include substantially transparent sensing points or nodes dispersed about a sheet of glass or plastic.

Unfortunately, however, use of glass with portable electronic devices requires that the glass be relatively thin. Generally speaking, the thinner the glass the more susceptible the glass is to damage when the portable electronic device is stressed or placed under a significant force. Chemically strengthening has been used to strengthen glass. While chemically strengthening is effective, there is a continuing need to provide improved ways to provide cover glass that is thin and sufficiently strong to resist breakage.

SUMMARY

The invention relates to transparent structures for portions of electronic device housings. The transparent structures are formed from multiple layers of transparent (optically clear) materials. The multiple layers can include at least an outer glass layer and one or more other transparent layers that can be either glass or polymer layers. The multiple layers can be bonded together with one or more lamination layers. Accordingly, multi-layer transparent structures that are formed from multiple layers bonded together are able to be not only thin but also sufficiently strong and resistant to damage. The multi-layer transparent structures are well suited for use in consumer products, such as consumer electronic devices (e.g., portable electronic devices).

The invention can be implemented in numerous ways, including as a method, system, device, or apparatus. Several embodiments of the invention are discussed below.

As an electronic device, one embodiment can, for example, include at least an outer housing for the electronic device, and a plurality of electrical components provided within the outer housing. At least a portion of the outer housing can include at least a multi-layer housing structure. The multi-layer housing structure can include a first layer, a lamination layer, and a second layer. The first layer and second layer can be laminated together via the lamination layer.

As a consumer electronic product, one embodiment can, for example, include at least: a housing having a front surface, a back surface and side surfaces; electrical components provided at least partially internal to the housing, the electrical components including at least a controller, a memory, and a display, the display being provided at or adjacent the front surface of the housing; and a multi-layer cover structure provided at, over or in the front surface of the housing such that it is provided over the display. The multi-layer cover structure can include a first layer, a lamination layer and a second layer, and the first layer and second layer can be laminated together via the lamination layer.

As a method for forming a laminated glass structure, one embodiment can, for example, include at least the acts of: obtaining an outer glass layer, chemically strengthening the outer glass layer, obtaining a transparent layer, obtaining a lamination layer, and laminating the transparent layer to the outer glass layer via the lamination layer to form the laminated glass structure.

As a method for forming a laminated glass structure, one embodiment can, for example, include at least the acts of: obtaining a first glass layer, chemically strengthening the first glass layer, obtaining a second glass layer, chemically strengthening the second glass layer, obtaining a lamination layer, and forming the lamination glass structure from the first glass layer, the lamination layer and the second glass layer.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF EMBODIMENTS OF THE INVENTION

Figure 1:
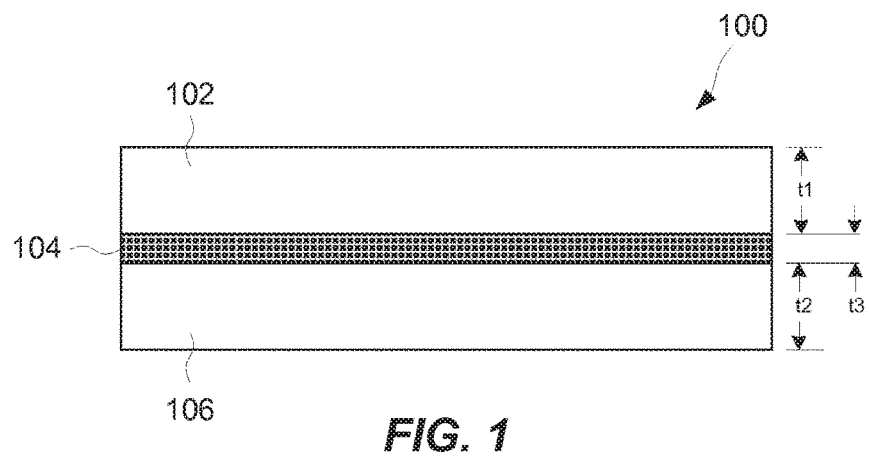
FIG. 1 is a simplified view of a multi-layer housing structure according to one embodiment.

The invention relates to transparent structures for portions of electronic device housings. The transparent structures are formed from multiple layers of transparent (optically clear) materials. The multiple layers can include at least an outer glass layer and one or more other transparent layers that can be either glass or polymer layers. The multiple layers can be bonded together with one or more lamination layers. Accordingly, multi-layer transparent structures that are formed from multiple layers bonded together are able to be not only thin but also sufficiently strong and resistant to damage. Since the transparent structures include at least one glass layer, the transparent structures can also be referred to as glass articles (or multi-layer glass articles). The multi-layer transparent structures are well suited for use in consumer products, such as consumer electronic devices (e.g., portable electronic devices).

Embodiments of the invention can relate to apparatus, systems and methods for improving strength of a glass article for a consumer product, such as a consumer electronic device. In one embodiment, the glass article may be an outer surface of a consumer electronic device. For example, the glass article may, for example, correspond to a glass cover that helps form part of a display area of the electronic device (i.e., situated in front of a display either as a separate part or integrated within the display). As another example, the glass article may form a part of a housing for the consumer electronic device (e.g., may form an outer surface other than in the display area). In another embodiment, the glass article may be an inner component of a consumer electronic device. For example, the glass article can be a component glass piece of a LCD display provided internal to the housing of the consumer electronic device.

The apparatus, systems and methods for improving strength of thin glass articles are especially suitable for glass covers or displays (e.g., LCD displays), particularly those assembled in small form factor electronic devices such as handheld electronic devices (e.g., mobile phones, media players, personal digital assistants, remote controls, etc.). The glass articles can be thin in these small form factor embodiments, such as less than 3 mm, or more particularly between 0.3 and 2.5 mm. The apparatus, systems and methods can also be used for glass covers or displays for other devices including, but not limited to, relatively larger form factor electronic devices (e.g., portable computers, tablet computers, displays, monitors, televisions, etc.). The glass articles can also be thin in these larger form factor embodiments, such as less than 5 mm, or more particularly between 0.3 and 3 mm.

Embodiments of the invention are discussed below with reference to FIGS. 1-8. However, those skilled in the art will readily appreciate that the detailed description given herein with respect to these figures is for explanatory purposes as the invention extends beyond these limited embodiments. The illustrations provided in these figures are not necessarily drawn to scale; instead, the illustrations are presented in a manner to facilitate presentation.

FIG. 1 is a simplified view of a multi-layer housing structure 100 according to one embodiment. The multi-layer housing structure 100 can, for example, be used as at least a portion of an outer housing for an electronic device. More particularly, the multi-layer housing structure 100 is well suited for use as at least a portion of an outer housing for a portable electronic device (specifically, compact portable electronic devices).

The multi-layer housing structure 100 has a multi-layer structure. In particular, the multi-layer housing structure 100 includes a glass layer 102 that provides an outer surface for the multi-layer housing structure 100, and thus also for at least a portion of the outer housing for the electronic device.

The multi-layer housing structure 100 also includes a lamination layer 104 as well as a transparent layer 106. The lamination layer 104 serves to bond together the glass layer 102 and the transparent layer 106. The bonding together of the glass layer 102 and the transparent layer 106 via the lamination layer 104 can be denoted as a lamination, whereby the multi-layer housing structure 100 is formed from the lamination of the transparent layer 106 to the glass layer 102 using the lamination layer 104.

Typically, the multi-layer housing structure 100 is to be optically clear or transparent. The glass layer 102 and the transparent layer 106 are inherently optically clear or transparent. The lamination layer 104 is also optically clear or transparent. Although it is desired that the distinct layers of the multi-layer housing structure 100 be optically clear or transparent, it is understood that certain materials may not be completely optically clear or transparent, thus, it is sufficient that these layers be substantially optically clear when formed into the multi-layer housing structure 100. Also, in some embodiments, the lamination layer 104 might be initially opaque before being activated to bond with other layers of the multi-layer housing structure 100; however, once the lamination layer 104 is activated, the lamination layer 104 turns clear or transparent (at least substantially so).

The transparent layer 106 is typically an internal layer that does not form an outer user surface for the housing for the electronic device. As a result, the transparent layer 106 can use different materials depending upon its particular product application. As an example, the transparent layer 106 can correspond to a glass layer or can correspond to a polymer-based layer.

In one embodiment, the lamination layer 104 can be referred to as a lamination film. The lamination layer 104 can pertain to any material that is suitable for lamination of the glass layer 102 with the transparent layer 106. One example of a lamination material is polyvinyl butyral (PVB). PVB is a resin that provides strong binding, optical clarity, adhesion to many surfaces, toughness and flexibility. Other examples of lamination materials include thermoplastic polyurethane (TPU).

Figure 2A:
FIGS. 2A-2O illustrate assembly of a multi-layer housing structure according to one embodiment.
Figure 2B:
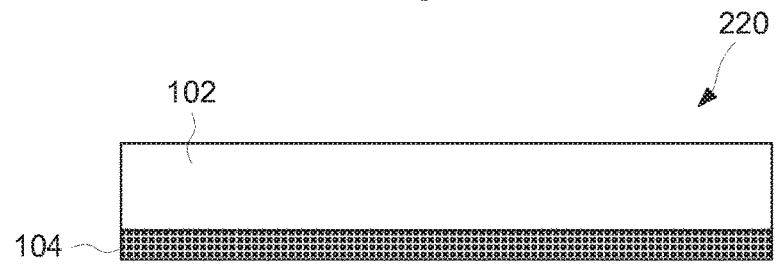
Figure 2C:
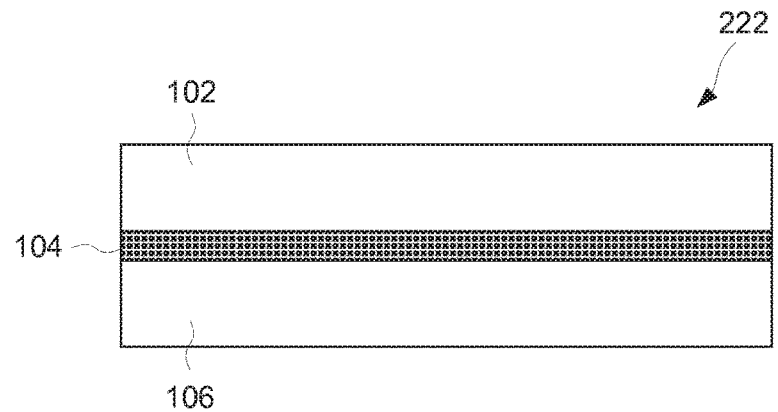

FIGS. 2A-2C illustrate assembly of a multi-layer housing structure according to one embodiment. As illustrated, the multi-layer housing structure being assembled is the multi-layer housing structure 100 illustrated in FIG. 1.

In FIG. 2A, the glass layer 102 is depicted as a separate member. In FIG. 2B, the lamination layer 104 is placed adjacent the bottom surface of the glass layer 102. Thereafter, as shown in FIG. 2C, the transparent layer 106 is placed adjacent the lamination layer 104. Once the multi-layer housing structure is arranged as illustrated in FIG. 2C, the lamination process which serves to bond the glass layer 102 to the transparent layer 106 using the lamination layer 104 can be activated. In one implementation, the lamination process can be activated by placing the multi-layer housing structure in a elevated temperature environment (e.g., an oven). In another implementation, the lamination process can be activated by placing the multi-layer housing structure in an RF environment where radio frequency energy can be induced into the lamination layer 104 to activate the lamination process.

Although the widths of the glass layer 102, the lamination layer 104 in the transparent layer 106 illustrated in FIGS. 2A-2O are shown as being same, it should be understood that the various layers need only be overlapping and thus the width of the respective players can vary depending upon implementation. For example, the transparent layer 106 could have a reduced width.

Figure 3:
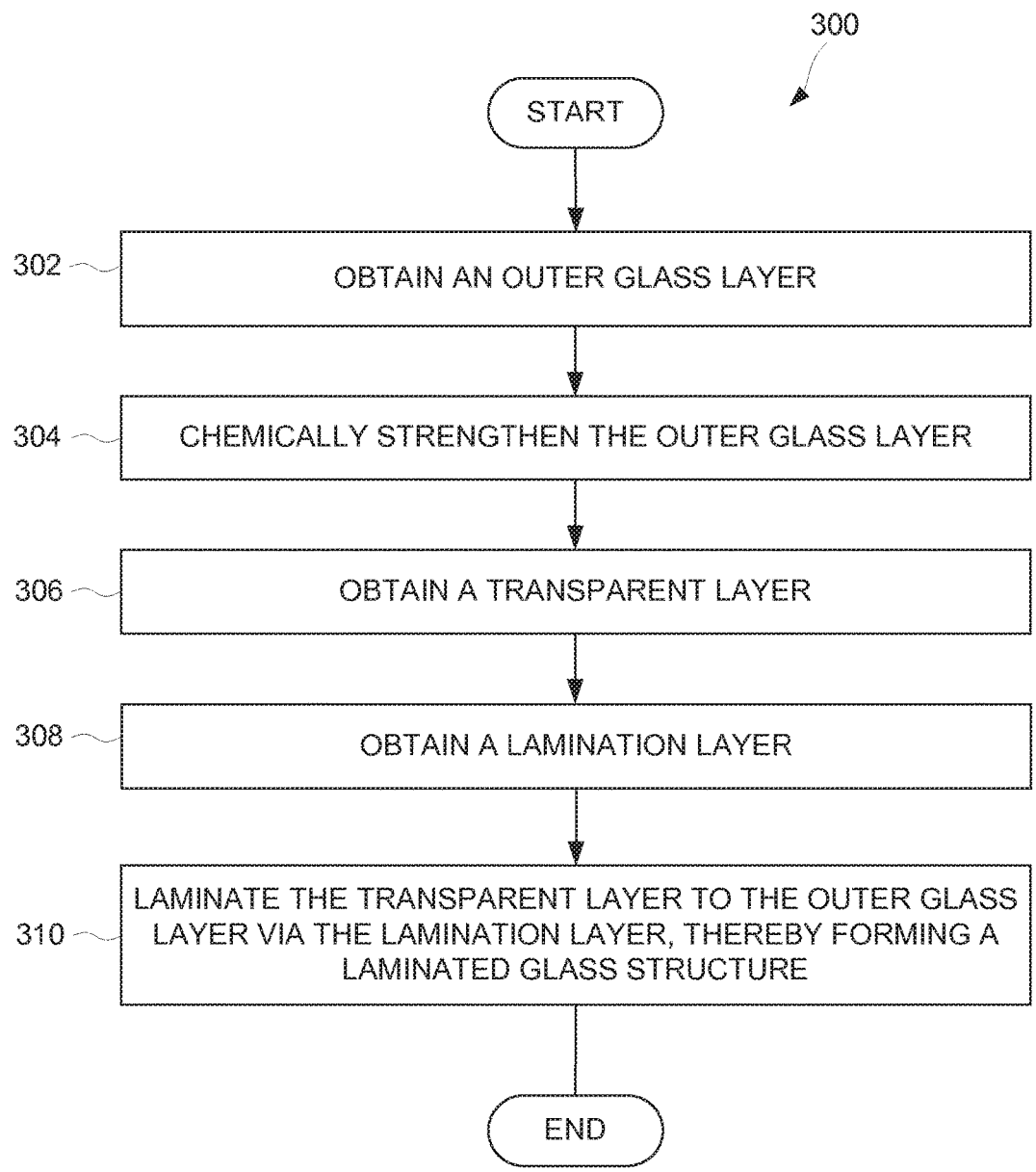
FIG. 3 is a flow diagram of a lamination process according to one embodiment.

FIG. 3 is a flow diagram of a lamination process 300 according to one embodiment. The lamination process 300 can operate to assemble or form a laminated structure, such as a laminated glass structure having at least one glass layer.

The lamination process 300 initially obtains 302 an outer glass layer. The outer glass layer can serve as one side of the laminated structure can be formed or assembled. The outer glass layer can then be chemically strengthened 304. By chemically strengthening the outer glass layer, the outer glass layer is better able to resist damage (such as breakage), such as when subjected to an impact event.

In addition, a transparent layer is obtained 306. The transparent layer can serve as an inner layer or an intermediate layer for the multi-layer structure. The transparent layer can be formed of glass or can be formed of a polymer. A lamination layer can also be obtained 308. The lamination layer is a thin layer of a material that can serve to laminate together the outer glass layer to the transparent layer. Hence, the lamination process 300 then operates to laminate 310 the transparent layer with the outer glass layer via the lamination layer, thereby forming a laminated structure. For example, the lamination layer can be between the outer glass layer and the transparent layer, and then lamination can cause the lamination layer to bond to adjacent surfaces of the outer glass layer and the transparent layer.

To laminate 310 the transparent layer with the outer glass layer, the lamination layer typically needs to be activated, such as by heating the lamination layer or inducing energy (e.g., RF energy) into the lamination layer. The lamination serves to strongly bond, e.g., fuse, together the outer glass layer and the transparent layer. Following the lamination 310, the lamination process 300 is complete and can therefore end.

Figure 4:
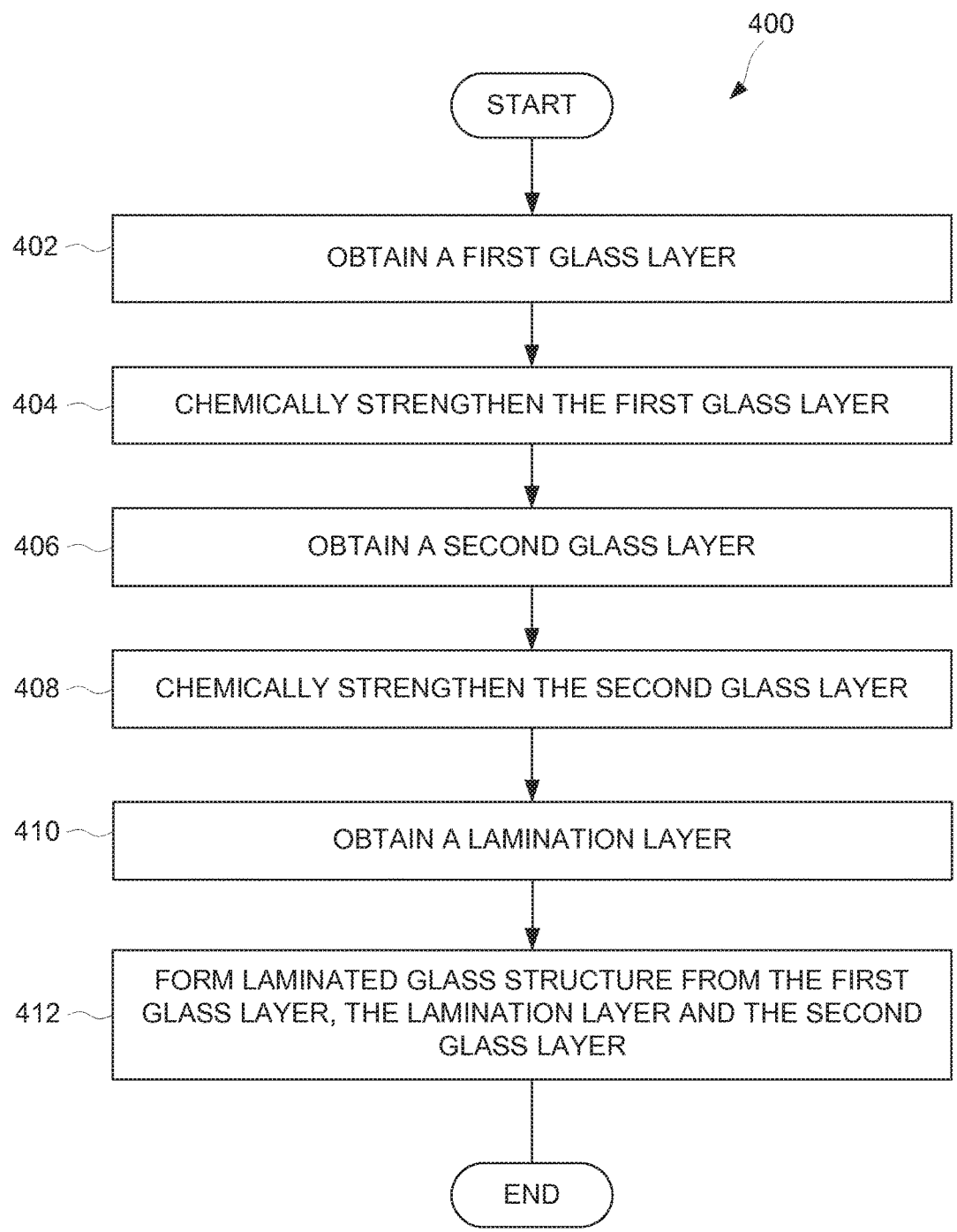
FIG. 4 is a flow diagram of a lamination process according to another embodiment.

FIG. 4 is a flow diagram of a lamination process 400 according to another embodiment. The lamination process 400 can operate to assemble or form a laminated structure, such as a laminated glass structure having at least two glass layers.

The lamination process 400 can obtain 402 a first glass layer. The first glass layer can then be chemically strengthened 404. By chemically strengthening the first glass layer, the first glass layer is better able to resist damage (such as breakage), such as when subjected to an impact event.

In addition, as second glass layer can be obtained 406. Similarly, the second glass layer can be chemically strengthened 408. By chemically strengthening the second class layer, the second glass layer is better able to resist damage (such as breakage), such as when subjected to an impact event. In one embodiment, the chemical strengthening 404 applied to the first glass layer is performed to a different level, degree or state than is the chemical strengthening applied to the second class layer. In other words, it may be desirable to chemically strengthen the different glass layers of the multi-layer housing structure in different ways. Specifically, in one example, the outer glass layer could be chemically strengthened to provide a relatively deep depth of layer, whereas an inner layer or the second glass layer can have a smaller depth of layer but a higher compressive stress.

Still further, the lamination process 400 obtains 410 a lamination layer. The lamination layer can be used to form 412 the laminated glass structure from the first glass layer and the second glass layer after the laminated glass structure has been formed 412, the lamination process 400 can and.

Figure 5:
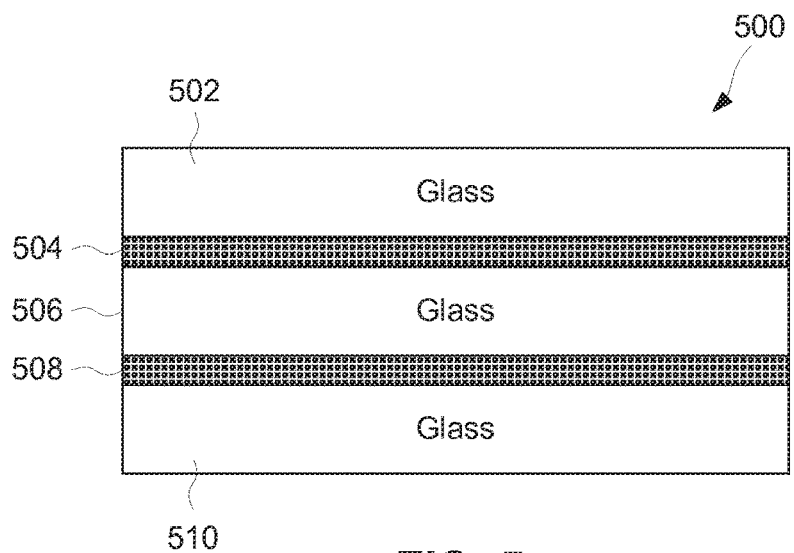
FIG. 5 is a simplified view of a multi-layer housing structure according to another embodiment.

FIG. 5 is a simplified view of a multi-layer housing structure 500 according to another embodiment. The multi-layer housing structure 500 includes three distinct glass layers that are laminated together to form a multi-layer structure that can be used as part of a housing for an electronic device. The multi-layer housing structure 500 can include a glass layer 502 that can serve as an outer surface member for a portion of the multi-layer housing structure 500. A lamination layer 504 can be provided between the glass layer 502 and a second glass layer 506. The lamination layer 504 can serve to bond together a bottom layer of the first glass layer 502 and a top surface of the second class layer 506. In addition, a second lamination layer 508 can be provided between the second glass layer 506 and a third glass layer 510. The lamination layer 508 can serve to bond together a bottom layer of the second class layer 506 and a top layer of the third glass layer 510.

Figure 6A:
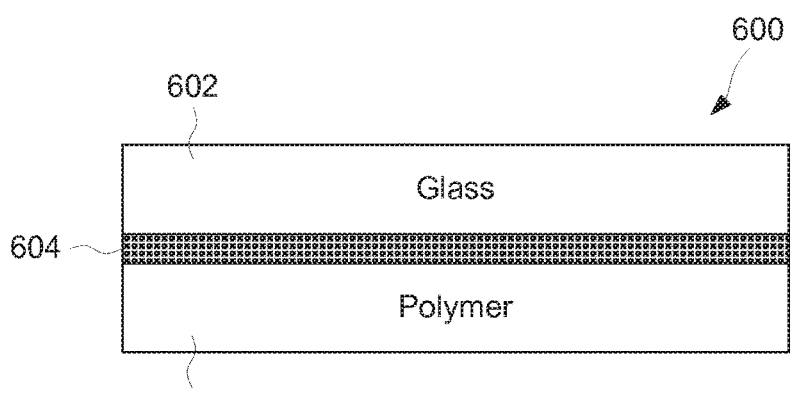
FIG. 6A is a simplified view of a multi-layer housing structure according to another embodiment.

FIG. 6A is a simplified view of a multi-layer housing structure 600 according to another embodiment. The multi-layer housing structure 600 includes two distinct layers that are laminated together to form a multi-layer structure that can be used as part of a housing for an electronic device. In particular, the multi-layer housing structure 600 can include a first glass layer 602 that serves as an outer surface member for the multi-layer housing structure 600. In addition, a lamination layer 604 can be provided between the first glass layer 602 and a polymer layer 606. The lamination layer 604 can serve to bond together a bottom surface of the first glass layer 602 and a top surface of the polymer layer 606. The bonding provided using the lamination layer 604 is stronger than an adhesive bond (e.g., pressure sensitive adhesive).

Figure 6B:
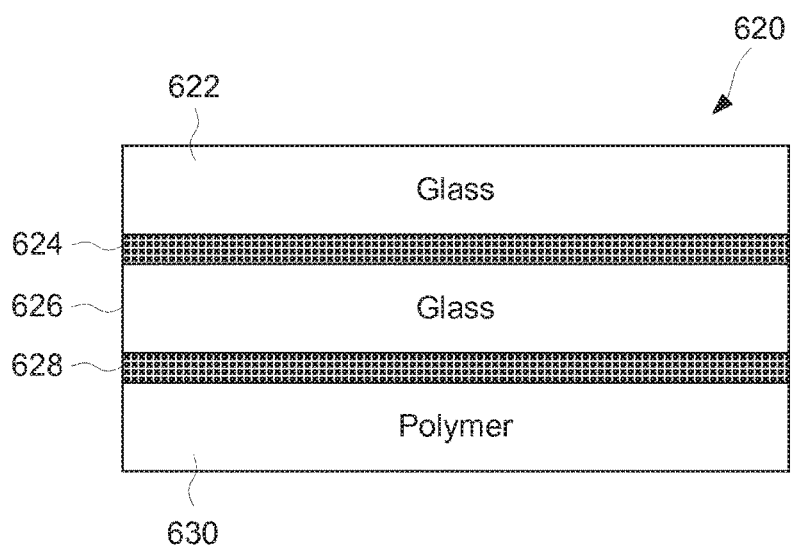
FIG. 6B is a simplified view of a multi-layer housing structure according to another embodiment.

FIG. 6B is a simplified view of a multi-layer housing structure 620 according to another embodiment. The multi-layer housing structure 620 includes two distinct glass layers and one polymer layer that are laminated together to form a multi-layer structure that can be used as part of a housing for an electronic device. The multi-layer housing structure 620 can include a glass layer 622 that can serves as an outer surface member for a portion of the multi-layer housing structure 620. A lamination layer 624 can be provided between the glass layer 622 and a second glass layer 626. The lamination layer 624 can serve to bond together a bottom layer of the first glass layer 622 and a top surface of the second class layer 626. In addition, a second lamination layer 628 can be provided between the second glass layer 626 and a polymer layer 630. The lamination layer 628 can serve to bond together a bottom layer of the second class layer 626 and a top layer of the polymer layer 630.

Figure 6C:
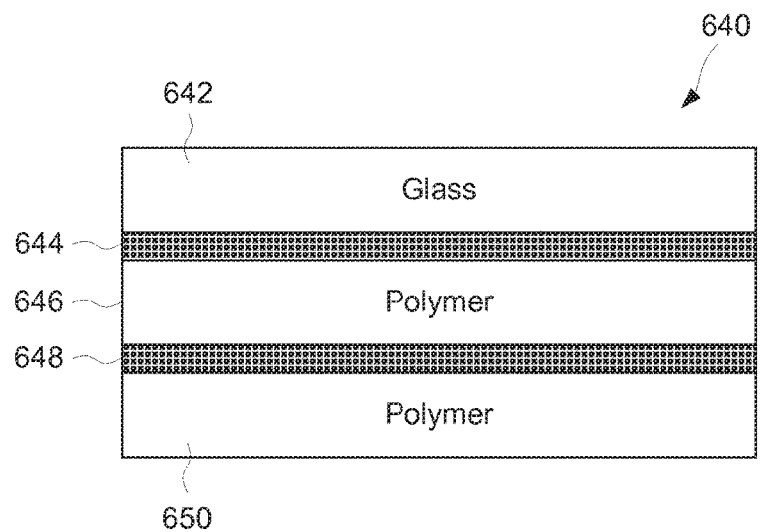
FIG. 6C is a simplified view of a multi-layer housing structure according to another embodiment.

FIG. 6C is a simplified view of a multi-layer housing structure 640 according to another embodiment. The multi-layer housing structure 640 includes one glass layer and two distinct polymer layers that are laminated together to form a multi-layer structure that can be used as part of a housing for an electronic device. The multi-layer housing structure 640 can include a glass layer 642 that can serves as an outer surface member for a portion of the multi-layer housing structure 640. A lamination layer 644 can be provided between the glass layer 642 and a first polymer layer 646. The lamination layer 644 can serve to bond together a bottom layer of the first glass layer 642 and a top surface of the first polymer layer 646. In addition, a second lamination layer 648 can be provided between the first polymer layer 646 and a second polymer layer 650. The lamination layer 648 can serve to bond together a bottom layer of the first polymer layer 646 and a top layer of the second polymer layer 650.

Figure 7:
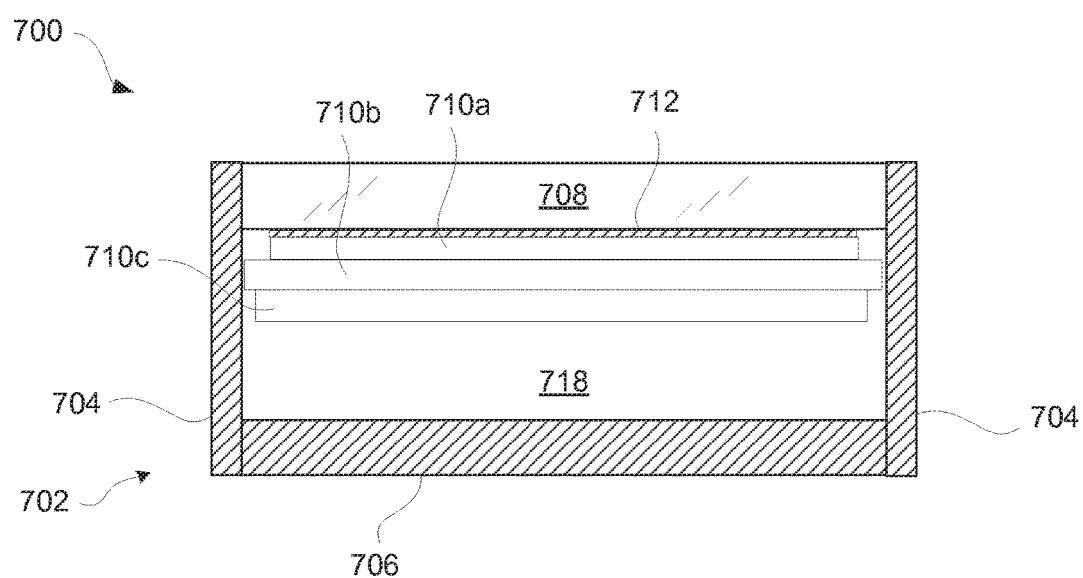
FIG. 7 is a cross-sectional view of an electronic device housing according to one embodiment.

FIG. 7 is a cross-sectional view of an electronic device housing 700 according to one embodiment. In one embodiment, the electronic device housing 700 can incorporate a multi-layer structure as discussed above.

The electronic device housing 700 includes a housing 702. The housing 702 include a side member 704 and a bottom member 706. A multi-layer translucent member 708 can be provided as a top surface for the electronic device housing 700. For example, the multi-layer translucent member 708 can be a multi-layer structure, often referred to as a cover glass, which can include at least one glass layer (glass member) and may also include at least one polymer-based layer (polymer-based member). For example, the polymer-based layer(s), if provided, can be formed of plastic. In different embodiment, the multi-layer translucent member 708 can be implemented as shown in FIGS. 1, 5 and 6A-6C.

The electronic device housing 700 can include a display screen assembly 710. The display screen assembly 710 can be secured to a bottom surface of the translucent member 708 by a layer of adhesive 812 (e.g., translucent adhesive). The display screen assembly 710 can include one or a plurality of distinct technology components that can be laminated together. In one implementation, the technology components can, for example, include a sensing layer (e.g., touch sensors), a display technology layer (e.g., LCD panel) and/or a backlight layer. In another implementation, the technology components can, for example, include an organic light emitting diode (OLED) panel with or without a sensing layer (e.g., touch sensors).

In addition, however, the electronic device housing 700 depicts one embodiment of the display screen assembly 710 has having at least three (3) distinct technology layers, namely, a Liquid Crystal Display (LCD) panel layer 710a (e.g., TFT LCD), a touch sensing layer 710b and a backlight layer 710c. These layers themselves can include multiple layers or additional layers can also be present, such as polarizers, color filters, etc.

An internal space 718 is provided internal to the electronic device housing 700 whereby various electrical components (e.g., including processor, memory, battery and circuit board) can be attached, affixed or placed so as to provide electronic operations for the electronic device.

In general, the various members, parts or assemblies of the electronic device housing 700 can be formed of any of a variety of materials, e.g., glass, polymers or metal. In one embodiment, the multi-layer translucent member 708 is at least partially formed of glass, and the housing 702 is formed from glass, polymer (e.g., plastic) or metal.

Additionally, it should be understood that one or more of the layers of the display screen assembly 710 could be integrated with the multi-layer translucent member 708. In one example, the LCD panel layer 710a could be integrated with the multi-layer translucent member 708 such as by being bonded (e.g., laminated) to the bottom surface of the multi-layer translucent member 708. In another example, the LCD panel layer 710a and the touch sensing layer 710b could be integrated with the multi-layer translucent member 708 such as by being successively bonded (e.g., laminated) to the bottom surface of the multi-layer translucent member 708. In still another example, the LCD panel layer 710a, the touch sensing layer 710b and the backlight layer 710c could be integrated with the multi-layer translucent member 708 such as by being successively bonded (e.g., laminated) to the bottom surface of the multi-layer translucent member 708. An adhesive layer can be used to secure any of the remaining layers of the display screen assembly 710 not integrated to the multi-layer translucent member 708 through lamination.

Figure 8:
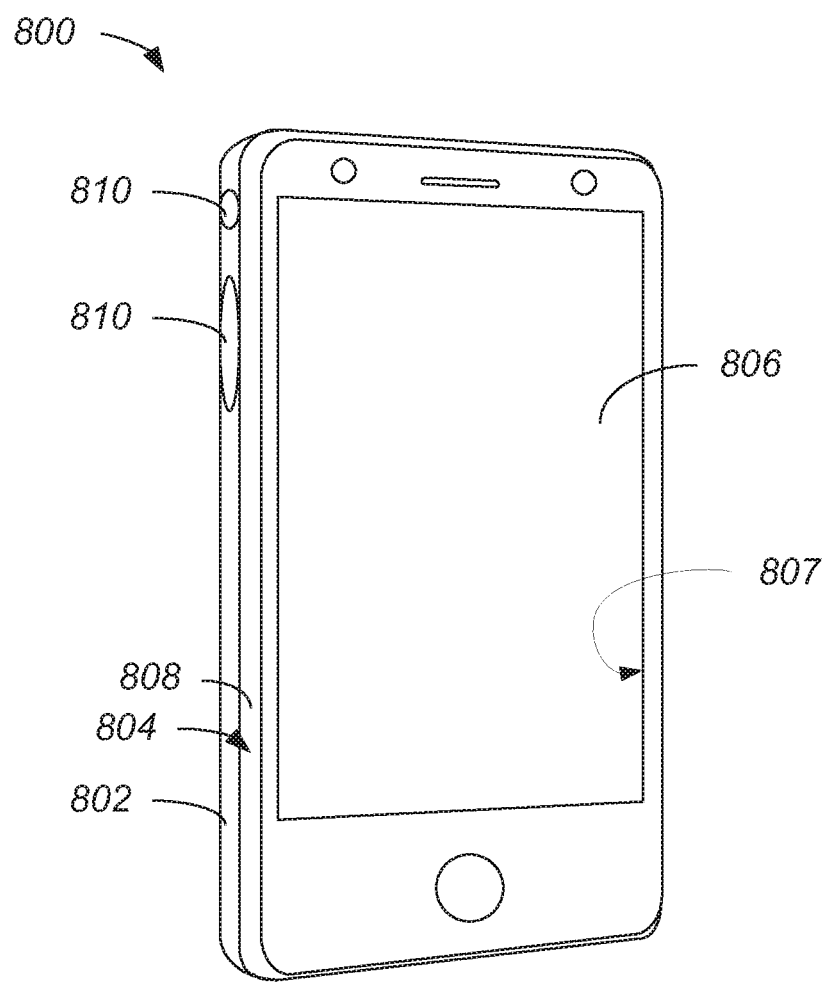
FIG. 8 is a perspective diagram of a handheld electronic device according to one embodiment.

FIG. 8 is a perspective diagram of a handheld electronic device 800 according to one embodiment. The handheld electronic device 800 may include a housing 802, e.g., a periphery member, that is arranged to at least partially surround the periphery of the handheld electronic device 800 to form some or all of the outer-most side, top and bottom surfaces of the handheld electronic device 800. The handheld electronic device 800 also includes a cover piece 804 that is arranged to be substantially coupled to housing 802 to effectively enclose an inner volume of the handheld electronic device 800. The cover piece 804 may include a multi-layer transparent member 806, e.g., cover glass provided over a display of the handheld electronic device 800. In one embodiment, the cover piece 804 includes a protective frame 808 in which the multi-layer transparent member 806 is held. The multi-layer transparent member 806 can serve as the top surface of the housing 802. A display region 807 of the multi-layer transparent member 806 is that portion of the multi-layer transparent member 806 that corresponds to the display (e.g., active display region). Using the techniques described herein, the multi-layer transparent member 806 can include at least one glass layer and at least one transparent layer (glass or polymer) bonded together.

The housing 802 may have any suitable shape, including, for example, one or more elements that may be combined to form a rectangular structure. The housing 802 may at least partially enclose an inner volume in which electronic device components may be assembled and retained. The shape of the housing 802 may substantially define boundaries of the inner volume, and may be determined based upon the size and type of components placed within the inner volume.

The housing 802 may have any suitable size, and the size may be determined based on any suitable criteria. Suitable criteria may include, but are not limited to including, aesthetics or industrial design, structural considerations, components required for a desired functionality, and/or product design. The housing 802 may have any suitable cross-section, including for example a variable cross-section or a constant cross-section. In some embodiments, the cross-section may be selected based on desired structural properties for the housing 802. For example, the cross-section of housing 802 may be substantially rectangular, such that the height of the housing 802 is substantially larger than the width of the housing 802. Such a cross-sectional shape may provide structural stiffness in compression and tension, as well as in bending. In some embodiments, the dimensions of the housing 802 cross-section may be determined relative to the dimensions of the components contained by housing 802.

In some embodiments, the housing 802 may include features 810. The features 810 may generally include one or more openings, knobs, extensions, flanges, chamfers, or other features for receiving components or elements of the device. The features 810 of the housing 802 extend from any surface of housing 802, including for example from internal surfaces, e.g., to retain internal components or component layers, or from external surfaces. In particular, the housing 802 may include a slot or opening (not shown) for receiving a card or tray within the handheld electronic device 800. The housing 802 may also include a connector opening (not shown), e.g., for a 30-pin connector, through which a connector may engage one or more conductive pins of the handheld electronic device 800. Other features 810 included on the housing 802 may include, but are not limited to, an opening for providing audio to a user, an opening for receiving audio from a user, an opening for a connector (e.g., audio connector or power supply connector), and/or features for retaining and enabling a button such as a volume control or silencing switch.

As noted above, the electronic device can be a handheld electronic device or a portable electronic device. The invention can serve to enable a glass cover to be not only thin but also adequately strong. Since handheld electronic devices and portable electronic devices are mobile, they are potentially subjected to various different impact events and stresses that stationary devices are not subjected to. As such, the invention is well suited for implementation of glass surfaces for handheld electronic device or a portable electronic device that are designed to be thin.

The strengthened glass, e.g., glass covers or cover windows, is particularly useful for thin glass applications. For example, the thickness of a glass cover being strengthened can be between about 0.5-2.5 mm. In other embodiments, the strengthening is suitable for glass products whose thickness is less than about 2 mm, or even thinner than about 1 mm, or still even thinner than about 0.6 mm.

In one embodiment, the size of the glass cover depends on the size of the associated electronic device. For example, with handheld electronic devices, the size of the glass cover is often not more than five (5) inches (about 12.7 cm) diagonal. As another example, for portable electronic devices, such as smaller portable computers or tablet computers, the size of the glass cover is often between four (4) (about 10.2 cm) to twelve (12) inches (about 30.5 cm) diagonal. As still another example, for portable electronic devices, such as full size portable computers, displays (including televisions) or monitors, the size of the glass cover is often between ten (10) (about 25.4 cm) to twenty (20) inches (about 50.8 cm) diagonal or even larger.

However, it should be appreciated that with larger screen sizes, the thickness of the glass layers may need to be greater. The thickness of the glass layers may need to be increased to maintain planarity of the larger glass layers. While the displays can still remain relatively thin, the minimum thickness can increase with increasing screen size. For example, the minimum thickness of the glass cover can correspond to about 0.3 mm for small handheld electronic devices, about 0.5 mm for smaller portable computers or tablet computers, about 1.0 mm or more for full size portable computers, displays or monitors, again depending on the size of the screen. However, more generally, the thickness of the glass cover can depend on the application and/or the size of electronic device.

As discussed above, glass cover or, more generally, a glass piece may be chemically treated such that surfaces of the glass are effectively strengthened. Through such strengthening, glass pieces can be made stronger so that thinner glass pieces can be used with consumer electronic device. Thinner glass with sufficient strength allows for consumer electronic device to become thinner.

The techniques describe herein may be applied to glass surfaces used by any of a variety of electronic devices including but not limited handheld electronic devices, portable electronic devices and substantially stationary electronic devices. Examples of these include any known consumer electronic device that includes a display. By way of example, and not by way of limitation, the electronic device may correspond to media players, mobile phones (e.g., cellular phones), PDAs, remote controls, notebooks, tablet PCs, monitors, all in one computers and the like.

In general, the steps associated with the methods described herein may vary widely. Steps may be added, removed, altered, combined, and reordered without departing from the spirit or the scope of the invention.

The various aspects, features, embodiments or implementations of the invention described above can be used alone or in various combinations.

Additional details on strengthening edges of glass articles and/or different chemical baths can be found in: (i) U.S. Provisional Patent Application No. 61/156,803, filed Mar. 2, 2009 and entitled "TECHNIQUES FOR STRENGTHENING GLASS COVERS FOR PORTABLE ELECTRONIC DEVICES", which is herein incorporated by reference; (ii) International Patent Application No. PCT/US2010/025979, filed Mar. 2, 2010 and entitled "Techniques for Strengthening Glass Covers for Portable Electronic Devices", which is herein incorporated by reference; (iii) U.S. Provisional Patent Application No. 61/374,988, filed Aug. 18, 2010, and entitled "ENHANCED STRENGTHENING OF GLASS", which is hereby incorporated herein by reference; (iv) U.S. patent application Ser. No. 12/895,823, filed Sep. 30, 2010 and entitled "ENHANCED STRENGTHENING OF GLASS"; (v) U.S. patent application Ser. No. 12/895,372, filed Sep. 30, 2010 and entitled "TECHNIQUES FOR STRENGTHENING GLASS COVERS FOR PORTABLE ELECTRONIC DEVICES", which is herein incorporated by reference; (vi) U.S. patent application Ser. No. 12/895,393, filed Sep. 30, 2010 and entitled "TECHNIQUES FOR STRENGTHENING GLASS COVERS FOR PORTABLE ELECTRONIC DEVICES", which is herein incorporated by reference; (vii) Provisional Patent Application No. 61/301,585, filed Feb. 4, 2010 and entitled "TECHNIQUES FOR STRENGTHENING GLASS COVERS FOR PORTABLE ELECTRONIC DEVICES," which is hereby incorporated herein by reference; (viii) U.S. Provisional Patent Application No. 61/410,290, filed Nov. 4, 2010, and entitled "ENHANCED STRENGTHENING OF GLASS", which is hereby incorporated herein by reference; (ix) PCT International Application No. PCT/US2011/023499, filed Feb. 2, 2011, and entitled "ENHANCED CHEMICAL STRENGTHENING GLASS OF COVERS FOR PORTABLE ELECTRONIC DEVICES", which is hereby incorporated herein by reference; (x) U.S. patent application Ser. No. 12/847,926, filed Jul. 30, 2010, and entitled "ELECTRONIC DEVICE HAVING SELECTIVELY STRENGTHENING GLASS COVER GLASS", which is hereby incorporated herein by reference; (xi) U.S. Provisional Patent Application No. 61/453,404, filed Mar. 16, 2011, and entitled "ELECTRONIC DEVICE HAVING SELECTIVELY STRENGTHENED GLASS", which is hereby incorporated herein by reference; and (xii) U.S. patent application Ser. No. 13/235,090, filed Sep. 16, 2011, and entitled "ELECTRONIC DEVICE HAVING SELECTIVELY STRENGTHENED GLASS", which is hereby incorporated herein by reference.

Additional details on compact housing configurations for portable electronic device can be found in: (i) U.S. patent application Ser. No. 13/246,707, filed Sep. 27, 2011, and entitled "HOUSING FOR PORTABLE ELECTRONIC DEVICE WITH REDUCED BORDER REGION", which is herein incorporated by reference; and (ii) U.S. patent application Ser. No. 13/246,697, filed Sep. 27, 2011, and entitled "HOUSING FOR PORTABLE ELECTRONIC DEVICE WITH REDUCED BORDER REGION", which is herein incorporated by reference.

Although only a few embodiments of the invention have been described, it should be understood that the invention may be embodied in many other specific forms without departing from the spirit or the scope of the present invention. By way of example, the steps associated with the methods of the invention may vary widely. Steps may be added, removed, altered, combined, and reordered without departing from the spirit of the scope of the invention. Similarly, while operations are depicted in the drawings in a particular order, this should not be understood as requiring that such operations be performed in the particular order shown or in sequential order, or that all illustrated operations be performed, to achieve desirable results.

While this specification contains many specifics, these should not be construed as limitations on the scope of the disclosure or of what may be claimed, but rather as descriptions of features specific to particular embodiment of the disclosure. Certain features that are described in the context of separate embodiments can also be implemented in combination. Conversely, various features that are described in the context of a single embodiment can also be implemented in multiple embodiments separately or in any suitable subcombination. Moreover, although features may be described above as acting in certain combinations, one or more features from a claimed combination can in some cases be excised from the combination, and the claimed combination may be directed to a subcombination or variation of a subcombination.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A housing for an electronic device comprising:
a multi-layer cover for the housing including:
a first glass layer having a first level of chemical strengthening to a first depth of layer and defining at least a portion of an external surface of the electronic device; and
a second glass layer bonded to the first glass layer and having a second level of chemical strengthening different from the first level of chemical strengthening, the second level of chemical strengthening to a second depth of layer that is less than the first depth of layer; and
a glass housing structure defining an opening and having sides and a bottom defining at least a portion of the external surface of the electronic device, the multi-layer cover positioned over the opening in the glass housing structure.

2. The housing of claim 1, wherein the housing further comprises a lamination layer positioned between the first glass layer and the second glass layer.

3. The housing of claim 2, wherein the first glass layer, the second glass layer, and the lamination layer are transparent.

4. The housing of claim 1, wherein the multi-layer cover further comprises an additional layer bonded to the second glass layer.

5. The housing of claim 4, wherein the additional layer is a glass layer.

6. The housing of claim 4, wherein the additional layer is a polymer layer.

7. A housing for an electronic device comprising:
a front cover member for the housing including:
a first layer including a first chemically strengthened glass material having a first inner surface and a first outer surface, the first outer surface defining at least a first portion of an exterior surface of the housing and having a first compressive stress; and
a second layer including a second chemically strengthened glass material having a second inner surface and a second outer surface, the second inner surface having a second compressive stress that is less than the first compressive stress; and
a housing structure having glass sides and a bottom and defining at least a portion of an interior volume and a second portion of the exterior surface of the housing, the second inner surface of the front cover member coupled to the glass sides of the housing.

8. The housing of claim 7, wherein the second outer surface is bonded to the first inner surface.

9. The housing of claim 8, further comprising a lamination film bonded to the second outer surface and the first inner surface.

10. The housing of claim 7, further comprising a third layer including a transparent material having a third inner surface and a third outer surface, the third outer surface being bonded to the first inner surface.

11. The housing of claim 10, further comprising a first lamination film bonded to the third outer surface and the first inner surface and a second lamination film bonded to the third inner surface and the second outer surface.

12. The housing of claim 7, wherein:
the first layer has a thickness from 0.5 mm to 2.5 mm; and
the second layer has a thickness from 0.5 mm to 2.5 mm.

13. An electronic device housing comprising:
a glass housing structure having sides and a bottom formed from glass and defining at least a first portion of an exterior surface of the electronic device housing; and
a cover structure attached to the glass housing structure and comprising:
a first glass layer having a first compressive stress profile with a first depth, the first glass layer defining at least a second portion of the exterior surface of the electronic device housing; and
a second glass layer bonded to the first glass layer and having a second compressive stress profile with a second depth that is less than the first depth.

14. The electronic device housing of claim 13, wherein the first compressive stress profile has a first surface compressive stress and the second compressive stress profile has a second surface compressive stress, the second surface compressive stress being greater than the first surface compressive stress.

15. The electronic device housing of claim 13, wherein the cover structure is substantially transparent.

16. The electronic device housing of claim 13, wherein the cover structure comprises a display region.

17. The electronic device housing of claim 13, wherein:
the first glass layer has a thickness less than or equal to 1 mm; and
the second glass layer has a thickness less than or equal to 1 mm.

* * * * *